United States Patent
Kang et al.

(10) Patent No.: US 9,590,242 B2
(45) Date of Patent: Mar. 7, 2017

(54) PRECURSOR PARTICLES OF LITHIUM COMPOSITE TRANSITION METAL OXIDE FOR LITHIUM SECONDARY BATTERY AND CATHODE ACTIVE MATERIAL COMPRISING THE SAME

(71) Applicant: LG Chem, Ltd., Seoul (KR)

(72) Inventors: Seong Hoon Kang, Daejeon (KR); Byung Chun Park, Daejeon (KR); Ho Suk Shin, Seoul (KR); Sang Min Park, Daejeon (KR); Hong Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 254 days.

(21) Appl. No.: 14/290,120

(22) Filed: May 29, 2014

(65) Prior Publication Data
US 2014/0272587 A1 Sep. 18, 2014

Related U.S. Application Data

(63) Continuation of application No. PCT/KR2013/000712, filed on Jan. 29, 2013.

(30) Foreign Application Priority Data

Feb. 3, 2012 (KR) .................. 10-2012-0011113
Sep. 4, 2012 (KR) .................. 10-2012-0097454

(51) Int. Cl.
| | | |
|---|---|---|
| H01M 4/485 | (2010.01) | |
| H01M 4/505 | (2010.01) | |
| H01M 4/525 | (2010.01) | |
| C01G 53/00 | (2006.01) | |

(Continued)

(52) U.S. Cl.
CPC ............ *H01M 4/485* (2013.01); *C01G 53/50* (2013.01); *H01M 4/505* (2013.01); *H01M 4/525* (2013.01);

(Continued)

(58) Field of Classification Search
CPC .......... H01M 4/50; H01M 4/52; C01G 53/50; C01G 53/44; C01G 53/04; C01G 51/44; C01G 51/04
See application file for complete search history.

(56) References Cited

U.S. PATENT DOCUMENTS

| | | | |
|---|---|---|---|
| 2004/0013941 A1 | 1/2004 | Kobayashi et al. | |
| 2009/0272940 A1* | 11/2009 | Kikuya | H01M 4/131 252/182.1 |

(Continued)

FOREIGN PATENT DOCUMENTS

| | | |
|---|---|---|
| CN | 101998932 A | 3/2011 |
| CN | 103945934 A | 7/2014 |

(Continued)

OTHER PUBLICATIONS

Extended search report from European Application No. 13743401.5, dated Sep. 18, 2015.

(Continued)

*Primary Examiner* — Jeremiah Smith
(74) *Attorney, Agent, or Firm* — Lerner, David, Littenberg, Krumholz & Mentlik, LLP (57) ABSTRACT

Disclosed are precursor particles of a lithium composite transition metal oxide for lithium secondary batteries, wherein the precursor particles of a lithium composite transition metal oxide are composite transition metal hydroxide particles including at least two transition metals and having an average diameter of 1 μm to 8 μm, wherein the composite transition metal hydroxide particles exhibit monodisperse particle size distribution and have a coefficient of variation of 0.2 to 0.7, and a cathode active material including the same.

8 Claims, 5 Drawing Sheets

(51) Int. Cl.
  *C01G 51/00* (2006.01)
  *C01G 53/04* (2006.01)
  *H01M 4/52* (2010.01)
  *C01G 51/04* (2006.01)
  *H01M 4/50* (2010.01)
  *H01M 10/052* (2010.01)

(52) U.S. Cl.
  CPC ............ *C01G 51/04* (2013.01); *C01G 51/44* (2013.01); *C01G 53/04* (2013.01); *C01P 2004/03* (2013.01); *C01P 2004/61* (2013.01); *C01P 2006/40* (2013.01); *H01M 4/50* (2013.01); *H01M 4/52* (2013.01); *H01M 10/052* (2013.01); *Y02E 60/122* (2013.01); *Y02P 70/54* (2015.11); *Y02T 10/7011* (2013.01)

(56) References Cited

U.S. PATENT DOCUMENTS

2012/0043499 A1  2/2012  Shin et al.
2013/0288129 A1 10/2013  Toya et al.
2013/0337331 A1 12/2013  Mori et al.
2014/0234203 A1  8/2014  Park et al.

FOREIGN PATENT DOCUMENTS

| | | |
|---|---|---|
| EP | 2557068 A1 | 2/2013 |
| JP | 2004-342548 A | 12/2004 |
| JP | 2008-251191 A | 10/2008 |
| JP | 2010070431 A | 4/2010 |
| JP | 4840545 B1 | 12/2011 |
| JP | 2012-254889 A | 12/2012 |
| KR | 20030090529 A | 11/2003 |
| KR | 20050030899 A | 3/2005 |
| KR | 2007-0082900 A | 8/2007 |
| KR | 100765970 B1 | 10/2007 |
| KR | 20130009739 A | 1/2013 |

OTHER PUBLICATIONS

International Search Report for Application No. PCT/KR2013/000712 dated May 14, 2013.

* cited by examiner

PRECURSOR PARTICLES OF LITHIUM COMPOSITE TRANSITION METAL OXIDE FOR LITHIUM SECONDARY BATTERY AND CATHODE ACTIVE MATERIAL COMPRISING THE SAME

CROSS-REFERENCE TO RELATED APPLICATIONS

The present application is a continuation of International Application No. PCT/KR2013/000712 filed on Jan. 29, 2013, which claims the benefit of Korean Patent Application No. 10-2012-0097454, filed on Sep. 4, 2012 and Korean Patent Application No. 10-2012-0011113, filed on Feb. 3, 2012, the disclosures of which are incorporated herein by reference.

TECHNICAL FIELD

The present invention relates to precursor particles of a lithium composite transition metal oxide for lithium secondary batteries and a cathode active material including the same and, more particularly, to precursor particles of a lithium composite transition metal oxide for lithium secondary batteries, wherein the precursor particles of a lithium composite transition metal oxide are composite transition metal hydroxide particles including at least two transition metals and having an average diameter of 1 μm to 8 μm, wherein the composite transition metal hydroxide particles exhibit monodisperse particle size distribution and have a coefficient of variation of 0.2 to 0.7, and a cathode active material including the same.

BACKGROUND ART

As mobile device technology continues to develop and demand therefor continues to increase, demand for secondary batteries as energy sources is rapidly increasing. Among these secondary batteries, lithium secondary batteries, which exhibit high energy density and voltage and have long cycle lifespan and low self-discharge rate, are commercially available and widely used.

Among components of lithium secondary batteries, cathode active materials play a critical role in determining battery capacity and performance.

As cathode active materials, lithium cobalt oxides (e.g., $LiCoO_2$) having relatively excellent physical properties, such as excellent cycle characteristics and the like, are mainly used. However, cobalt used in $LiCoO_2$ is a rare metal and supply of cobalt is unstable because reserves and production thereof are limited. In addition, $LiCoO_2$ is expensive due to unstable supply of cobalt and increasing demand for lithium secondary batteries.

Under these circumstances, research on cathode active materials that can replace $LiCoO_2$ is continuously underway and, as representative alternative materials, lithium composite transition metal oxides including at least two transition metals selected from among nickel (Ni), manganese (Mn), and cobalt (Co) may be used.

Such lithium composite transition metal oxides exhibit excellent electrochemical properties through combination of high capacity of a lithium nickel oxide (e.g., $LiNiO_2$), thermal stability and low price of Mn in a lithium manganese oxide (e.g., $LiMnO_2$) having a layered structure, and stable electrochemical properties of $LiCoO_2$. However, it is not easy for such lithium composite transition metal oxides to be synthesized by simple solid-phase reaction.

Thus, such lithium composite transition metal oxides are prepared by separately preparing a composite transition metal precursor including at least two transition metals selected from among Ni, Mn, and Co by a sol-gel method, a hydrothermal method, spray pyrolysis, co-precipitation, or the like, mixing the composite transition metal precursor with a lithium precursor, and calcining the resulting mixture at high temperature.

A composite transition metal precursor is generally prepared by co-precipitation in consideration of cost, productivity, and the like.

Conventionally, in a case of preparation of a composite transition metal precursor by co-precipitation, to prepare a lithium composite transition metal oxide as a cathode active material having high discharge capacity, excellent lifespan characteristics, excellent rate characteristics, and the like, preparation of the composite transition metal precursor is performed focusing on optimization of particle shapes such as spherizing or the like. In this regard, structural properties in addition to spherizing of composite transition metal precursors are very important.

However, conventional composite transition metal precursor particles prepared by co-precipitation exhibit wide particle size distribution, have non-uniform shape, and contain a large amount of impurities.

In addition, conventional composite transition metal precursor particles prepared by co-precipitation have a minimum average diameter of 6 μm to 10 μm.

DISCLOSURE

Technical Problem

The present invention aims to address the aforementioned problems of the related art and to achieve technical goals that have long been sought.

Therefore, the object of the present invention is to provide composite transition metal precursor particles having excellent and uniform size and high crystallinity when compared to conventional composite transition metal precursors and a lithium transition metal oxide.

Technical Solution

In accordance with one aspect of the present invention, precursor particles of a lithium composite transition metal oxide for lithium secondary batteries include composite transition metal hydroxide particles including at least two transition metals and having an average diameter of 1 μm to 8 μm, wherein the composite transition metal hydroxide particles exhibit monodisperse particle size distribution in which a parameter that represents particle size distribution is not limited and, when the particle size distribution is represented as a coefficient of variation, the coefficient of variation is in the range of 0.2 to 0.7. The coefficient of variation is a value obtained by dividing standard deviation by mass median diameter D50.

While conventional composite transition metal hydroxide particles prepared by co-precipitation have a minimum average diameter of 6 μm to 10 μm, the composite transition metal hydroxide particles of the present invention may have a minimum average diameter of 1 μm to 5 μm. In addition, the composite transition metal hydroxide particles according to the present invention exhibit monodisperse particle size distribution as compared to conventional composite transition metal hydroxide particles having a coefficient of variation of 0.2 to 0.7.

Thus, the precursor particles of the present invention have smaller monodisperse particle size than conventional transition metal precursor particles and thus movement distance of lithium ions decreases during charge and discharge and, accordingly, rate characteristics are enhanced. In addition, such enhancement effects are more significantly exhibited in terms of low-temperature rate characteristics and, when the precursor particles are added together with existing large precursor particles, electrode packing density increases.

In an exemplary embodiment of the present invention, the precursor particles may have an average diameter of 1 μm to 5 μm.

The composite transition metal hydroxide may be a compound represented by Formula 1 below:

$$M(OH_{1-x})_2 \quad (1)$$

wherein M is at least two selected from the group consisting of nickel (Ni), cobalt (Co), manganese (Mn), aluminum (Al), copper (Cu), iron (Fe), magnesium (Mg), boron (B), chromium (Cr), and period 2 transition metals; and $0 \leq x \leq 0.8$.

In Formula 1 above, M represents two or more selected from among the above-defined elements. In one exemplary embodiment, M is at least one transition metal selected from the group consisting of Ni, Co, and Mn and thus physical properties of at least one of the transition metals may be exhibited in the lithium composite transition metal oxide. More preferably, M may represent two transition metals selected from the group consisting of Ni, Co, and Mn or all thereof.

In an exemplary embodiment in which M represents all of Ni, Co, and Mn, the compound of Formula 1 may be a compound represented by Formula 2 below:

$$Ni_bMn_cCo_{1-(b+c+d)}M''_d(OH_{1-x})_2 \quad (2)$$

wherein $0.3 \leq b \leq 0.9$, $0.1 \leq c \leq 0.6$, $0 \leq d \leq 0.1$, $b+c+d \leq 1$, $0 \leq x \leq 0.8$, and M" is at least one selected from the group consisting of Al, Mg, Cr, titanium (Ti), and silicon (Si). That is, the compound of Formula 1 may be the compound of Formula 2 where M represents all of Ni, Co, and Mn, which are partially substituted with at least one selected from the group consisting of Al, Mg, Cr, Ti, and Si.

The compound of Formula 2 includes a high content of Ni and thus may be used to prepare a cathode active material for high-capacity lithium secondary batteries.

The composite transition metal hydroxide particles exhibit higher crystallinity than conventional transition metal precursors. In particular, the crystallinity may be determined by the amount of impurities derived from a transition metal salt for preparation of a composite transition metal hydroxide.

As confirmed by the inventors of the present invention, the composite transition metal hydroxide particles include 0.4 wt % or less of impurities derived from a transition metal salt for preparation of a composite transition metal hydroxide based on a total weight of the composite transition metal hydroxide particles.

The impurities may be salt ions including sulfate ions ($SO_4^{2-}$). A transition metal salt from which the salt ions including sulfate ions ($SO_4^{2-}$) are derived may be a sulfate and the sulfate may, for example, be nickel sulfate, cobalt sulfate, manganese sulfate, or the like. These sulfates may be used alone or at least two thereof may be used in combination.

As desired, the salt ions including sulfate ions ($SO_4^{2-}$) may further include nitrate ions ($NO_3^-$), and the nitrate ions may be derived from a transition metal salt such as nickel nitrate, cobalt nitrate, manganese nitrate, or the like.

More preferably, the amount of the salt ions including sulfate ions ($SO_4^{2-}$) may be 0.3 wt % to 0.4 wt % based on the total weight of the composite transition metal hydroxide particles.

The amount of the salt ions in the precursor particles may be measured using various methods, preferably by ion chromatography.

The present invention also provides a lithium composite transition metal oxide prepared through calcination reaction between the transition metal precursor particles and a lithium precursor.

Reaction conditions of a transition metal precursor and a lithium-containing material to prepare a lithium composite transition metal oxide are known in the art and thus a detailed description thereof will be omitted herein.

The lithium precursor is not particularly limited and may, for example, be lithium hydroxide, lithium carbonate, lithium oxide, or the like. Particularly, the lithium precursor may be lithium carbonate ($Li_2CO_3$) and/or lithium hydroxide ((LiOH).

Lithium composite transition metal oxide particles of the present invention include at least two transition metals and have an average diameter of 1.0 μm to 8.5 μm, preferably of 1.0 μm to 5.5 μm. The lithium composite transition metal oxide particles exhibit monodisperse particle size distribution and have a coefficient of variation of 0.2 to 0.7.

The composite transition metal hydroxide particles may be prepared by introducing, into a rotating reaction space of a reactor, an aqueous solution of raw materials including an aqueous solution of at least two transition metal salts and a basic aqueous solution so as to maintain pH of the aqueous solution of raw materials at a constant level of 10 to 12 via an inlet of the reactor and performing co-precipitation thereof in a non-nitrogen atmosphere for 1 to 6 hours. The composite transition metal hydroxide particles may be obtained via an outlet.

The reactor has a closed structure including: a hollow fixed cylinder;

a rotating cylinder having the same axis as that of the hollow fixed cylinder and having an outer diameter that is smaller than an inner diameter of the fixed cylinder;

an electric motor to generate power for rotation of the rotating cylinder;

a rotating reaction space, as a separation space between the hollow fixed cylinder and the rotating cylinder, in which ring-shaped vortex pairs periodically arranged along a rotating shaft and rotating in opposite directions are formed; and an inlet and an outlet that respectively introduce and discharge a reaction fluid into and from the rotating reaction space.

When the composite transition metal hydroxide is prepared using a conventional co-precipitation reactor, e.g., a continuous stirred tank reactor (CSTR), a residence time of approximately 6 hours or longer is needed.

By contrast, when the composite transition metal hydroxide is prepared using the reactor according to the present invention, a maximum residence time of 6 hours is needed and thus a yield per unit volume of the reactor increases by about 1.5 to 10 times that when the CSTR is used.

Such effects may be obtained when a ratio of a distance between the fixed cylinder and the rotating cylinder to an outer radius of the rotating cylinder exceeds 0.05. In particular, when the ratio of the distance between the fixed cylinder and the rotating cylinder to the outer radius of the rotating cylinder is 0.05 or less, the distance between the fixed cylinder and the rotating cylinder is too small and thus it is impossible to constitute the elements.

Although it is possible to constitute the elements, an effective volume of the rotating reaction space in which the vortex pairs are formed decreases and thus the residence time decreases and, accordingly, yield significantly decreases.

Meanwhile, one vortex pair substantially acts as a single fine CSTR and thus the vortex pairs periodically arranged along a rotating shaft act as fine CSTRs connected to one another. As the number of the vortex pairs increases, flow characteristics are enhanced.

However, the size of the vortex pair is nearly similar to the distance between the fixed cylinder and the rotating cylinder and thus, as the ratio of the distance between the fixed cylinder and the rotating cylinder to the outer radius of the rotating cylinder increases or as the distance between the fixed cylinder and the rotating cylinder increases, the number of the vortex pairs in the reactor (the number of CSTRs) gradually decreases.

Thus, when the ratio of the distance between the fixed cylinder and the rotating cylinder to the outer radius of the rotating cylinder is 0.4 or more, flow characteristics of the vortex pairs are deteriorated and thus it is difficult to prepare uniform precursor particles exhibiting small particle size distribution and having a small average diameter, when compared to a case in which the ratio of the distance between the fixed cylinder and the rotating cylinder to the outer radius of the rotating cylinder is greater than 0.05 to less than 0.4.

In addition, when the ratio of the distance between the fixed cylinder and the rotating cylinder to the outer radius of the rotating cylinder is 0.4 or more, characteristics of continuous vortex, such as the ring-shaped vortex pairs (laminar vortex) periodically arranged along the rotating axis and rotating in opposite directions according to increase in rotation rate of the rotating cylinder, wavy vortex, modulated wavy vortex, and turbulent vortex, are not exhibited and transition from a laminar vortex region to a turbulent vortex region occurs right away, and thus, flow characteristics of the vortex pairs are deteriorated and, accordingly, it is difficult to prepare uniform precursor particles exhibiting small particle size distribution and having a small average diameter.

That is, the composite transition metal hydroxide particles prepared using the reactor may be prepared as uniform transition metal precursor particles exhibiting smaller particle size distribution and having a smaller average diameter than composite transition metal hydroxide particles prepared using a CSTR. However, control of such particle size distribution and average particle diameter may be implemented in a case in which the ratio of the distance between the fixed cylinder and the rotating cylinder to the outer radius of the rotating cylinder is less than 0.4.

Thus, the ratio of the distance between the fixed cylinder and the rotating cylinder to the outer radius of the rotating cylinder may be greater than 0.05 to less than 0.4.

The reactor is optimized to prepare composite transition metal hydroxide particles as a precursor of a lithium composite transition metal oxide for lithium secondary batteries. In this regard, the reaction fluid may have a kinematic viscosity of 0.4 to 400 cP and the reactor may have a power consumption per unit mass of 0.05 W/kg to 100 W/kg. The power consumption per unit mass may be defined as a stifling rate of the rotating cylinder.

The vortex pairs may have a critical Reynolds number of 300. When the critical Reynolds number of the vortex pairs exceeds 300, a fluid flowing between the fixed cylinder and the rotating cylinder that have the same center becomes unstable due to a tendency to proceed towards the fixed cylinder by centrifugal force and thus the vortex pairs may be formed over the entire rotating reaction space.

The transition metal salt may include anions that are readily decomposed and easily volatilize during calcination and may be a sulfate or a nitrate. For example, the transition metal salt may be at least one selected from the group consisting of nickel sulfate, cobalt sulfate, manganese sulfate, nickel nitrate, cobalt nitrate, and manganese nitrate, but embodiments of the present invention are not limited thereto.

In addition, the basic aqueous solution may be an aqueous sodium hydroxide solution, an aqueous potassium hydroxide solution, an aqueous lithium hydroxide solution, or the like, particularly an aqueous sodium hydroxide solution, but embodiments of the present invention are not limited thereto.

In one exemplary embodiment, the aqueous solution of the raw materials may further include an additive and/or an alkali carbonate capable of forming a complex with the transition metals.

The additive may, for example, be an ammonium ion source, an ethylene diamine-based compound, a citric acid-based compound, or the like. The ammonium ion source may, for example, be aqueous ammonia, an aqueous ammonium sulfate solution, an aqueous ammonium nitrate solution, or the like. The alkali carbonate may be selected from the group consisting of ammonium carbonate, sodium carbonate, potassium carbonate, and lithium carbonate. In some cases, at least two of the above-listed compounds may be used in combination.

Amounts of the additive and the alkali carbonate may be appropriately determined in consideration of amount, pH, and the like of a transition metal-containing salt.

The inventors of the present invention confirmed that, when a composite transition metal hydroxide is prepared using the preparation method according to the present invention, the amount of the additive for formation of a complex, e.g., aqueous ammonia, may be reduced.

In a specific embodiment, the aqueous ammonia is added in an amount of 5 to 90 mol % based on a total amount of the at least two transition metal salts.

This indicates that the composite transition metal hydroxide is prepared using only about 60% the amount of additive used in a case in which a composite transition metal hydroxide is prepared using a CSTR. Thus, according to the preparation method of the present invention, a lithium composite transition metal oxide may be prepared at relatively low cost.

Meanwhile, Mn readily becomes $Mn^{3+}$ through oxidation and, for example, $Mn^{3+}$ makes it difficult to form a uniform composite oxide with $Ni^{2+}$ and thus, in conventional co-precipitation, additives that prevent formation of Mn oxide are further added. However, the preparation method according to the present invention is performed in a reactor having a closed structure and thus external air is introduced into the reaction fluid and, accordingly, Mn oxide is not formed.

Thus, the preparation method according to the present invention is performed in a non-nitrogen atmosphere without adding a reducing agent, e.g., nitrogen and thus reduction effects of cost for introduction of nitrogen are obtained and manufacturing efficiency may be enhanced.

The present invention also provides a cathode active material slurry for lithium secondary batteries that includes the lithium composite transition metal oxide described above and a lithium secondary battery including the cathode active material slurry.

The cathode active material slurry includes the lithium composite transition metal oxide as a cathode active material and may further selectively include materials known in the art.

A lithium secondary battery generally includes a cathode, an anode, a separator, and a lithium salt-containing non-aqueous electrolyte.

The cathode may be manufactured by, for example, coating a mixture of the cathode active material, a conductive material, and a binder on a cathode current collector and drying the coated cathode current collector. As desired, the mixture may further include a filler.

The cathode current collector is generally fabricated to a thickness of 3 to 500 μm. The cathode current collector is not particularly limited so long as it does not cause chemical changes in the fabricated lithium secondary battery and has high conductivity. For example, the cathode current collector may be made of stainless steel, aluminum, nickel, titanium, sintered carbon, aluminum or stainless steel surface-treated with carbon, nickel, titanium, or silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 to 20 wt % based on the total weight of a mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and the conductive material and in binding of the active material to a current collector. The binder is typically added in an amount of 1 to 20 wt % based on the total weight of the mixture including the cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The anode is manufactured by coating an anode material on an anode current collector and drying the coated anode current collector. As desired, the components described above may be further added to the anode material.

Examples of the anode material include carbon such as hard carbon and graphite-based carbon; metal composite oxides such as $Li_xFe_2O_3$ where $0 \le x \le 1$, $Li_xWO_2$ where $0 \le x \le 1$, $Sn_xMe_{1-x}Me'_yO_z$ where Me:Mn, Fe, Pb, or Ge; Me':Al, B, P, Si, Groups I, II and III elements, or halogens; $0 \le x \le 1$; $1 \le y \le 3$; and $1 \le z \le 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The anode current collector is typically fabricated to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material and be used in various forms including films, sheets, foils, nets, porous structures, foams, and non-woven fabrics.

The separator is disposed between the cathode and the anode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of a non-aqueous electrolyte and a lithium salt. The non-aqueous electrolyte may be a non-aqueous electrolytic solution, an organic solid electrolyte, an inorganic solid electrolyte, or the like.

Examples of the non-aqueous electrolytic solution include non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas.

The lithium secondary battery may be used in a battery cell used as a power source of small devices and may be used as a unit cell in a medium and large-scale battery module including a plurality of battery cells.

The present invention also provides a battery pack including the battery module as a power source of medium and large-scale devices. Examples of the medium and large-scale devices include, but are not limited to, electric vehicles (EVs), hybrid EVs (HEVs), and plug-in HEVs (PHEVs); and devices for storing power.

BRIEF DESCRIPTION OF THE DRAWINGS

The above and other objects, features and other advantages of the present invention will be more clearly understood from the following detailed description taken in conjunction with the accompanying drawings, in which.

MODE FOR INVENTION

Now, the present invention will be described in more detail with reference to the accompanying drawings and the following examples. These examples are provided for illustration of the present invention only and should not be construed as limiting the scope and spirit of the present invention.

Example 1

Nickel sulfate, cobalt sulfate, and manganese sulfate were mixed in a molar ratio of 0.50:0.20:0.30 to prepare a 1.5 M aqueous transition metal solution, and a 3M aqueous sodium hydroxide solution was prepared. As aqueous ammonia, an aqueous solution in which 25 wt % of ammonium ions are dissolved was prepared.

The aqueous transition metal solution was continuously pumped into the reactor using a metering pump so that residence time thereof was 1 hour. The aqueous sodium hydroxide solution was pumped in a rate-variable manner using a metering pump so that pH thereof was maintained at 11.0. The aqueous ammonia was continuously supplied in an amount of 30 mol % based on the amount of the aqueous transition metal solution.

In this regard, average residence time was 1 hour. After reaching the steady state, a nickel-cobalt-manganese composite transition metal precursor, which was prepared by 20-hour continuous reaction, was washed several times with distilled water and dried in a 120° C. constant-temperature drying oven for 24 hours to obtain a final nickel-cobalt-manganese composite transition metal precursor.

Example 2

A nickel-cobalt-manganese composite transition metal precursor was prepared in the same manner as in Example 1, except that the supply amounts were changed so that the residence time was 2 hours.

Example 3

A nickel-cobalt-manganese composite transition metal precursor was prepared in the same manner as in Example 1, except that the supply amounts were changed so that the residence time was 3 hours.

Example 4

A nickel-cobalt-manganese composite transition metal precursor was prepared in the same manner as in Example 1, except that the supply amounts were changed so that the residence time was 6 hours.

Comparative Example 1

A nickel-cobalt-manganese composite transition metal precursor was prepared in the same manner as in Example 4, except that a continuous stirred tank reactor (CSTR) was used and the aqueous ammonia was supplied in an amount of 50 mol % based on the amount of the aqueous transition metal solution.

Experimental Example 1

Comparison in Productivity Per Unit Reactor Volume According to Residence Time

Productivities per unit volume of the reactors used in Examples 1 to 4 and Comparative Example 1 were compared. Results are shown in Table 1 below.

TABLE 1

|  | Residence time | Productivity per volume of reactor (g/L-hr) |
| --- | --- | --- |
| Example 1 | 1 hour | 55.4 |
| Example 2 | 2 hours | 27.7 |
| Example 3 | 3 hours | 18.5 |
| Example 4 | 6 hours | 9.2 |
| Comparative Example 1 | 6 hours | 6.1 |

Experimental Example 2

Analysis of Amount of Impurities 0.01 g of each of the prepared transition metal precursors was accurately weighed and added to a 50 mL Corning tube, a small amount of acid was added dropwise thereto, and the resulting material was mixed by shaking. When the mixed sample was fully dissolved, the concentration of $SO_4^{2-}$ of each sample was measured using an ion chromatograph (DX500 manufactured by Dionex). Results are shown in Table 2 below.

TABLE 2

|  | Residence time | Concentration of $SO_4^{2-}$ (wt %) |
| --- | --- | --- |
| Example 1 | 1 hour | 0.40 |
| Example 2 | 2 hours | 0.38 |
| Example 3 | 3 hours | 0.34 |
| Example 4 | 6 hours | 0.30 |
| Comparative Example 1 | 6 hours | 0.45 |

Experimental Example 3

Particle Size Distribution Graph

Figure 1A:
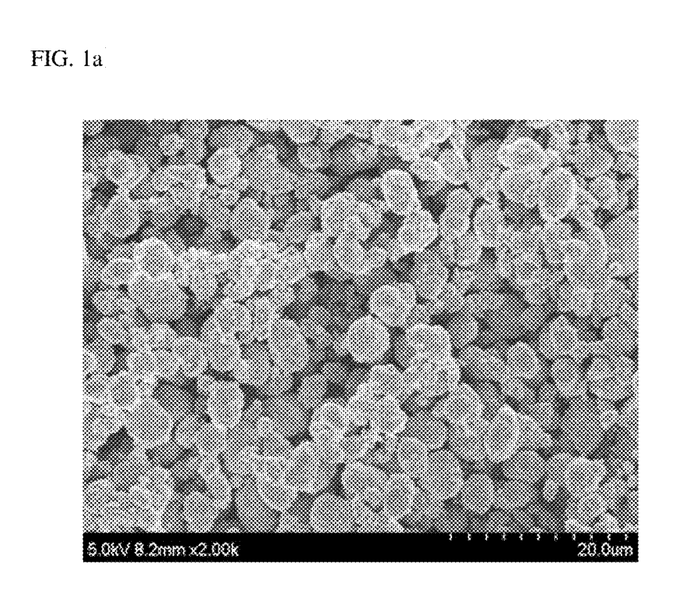
FIGS. 1A and 1B are scanning electron microscope (SEM) images of transition metal precursors prepared according to Example 1 and Comparative Example 1.
Figure 1B:
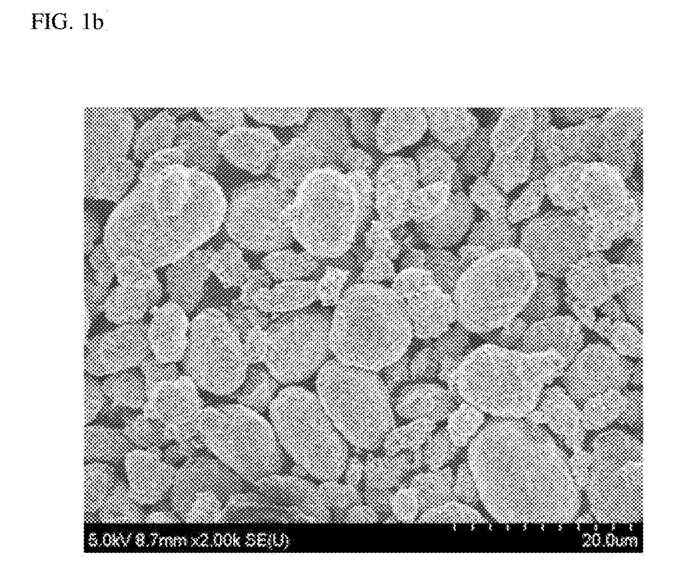
Figure 2:
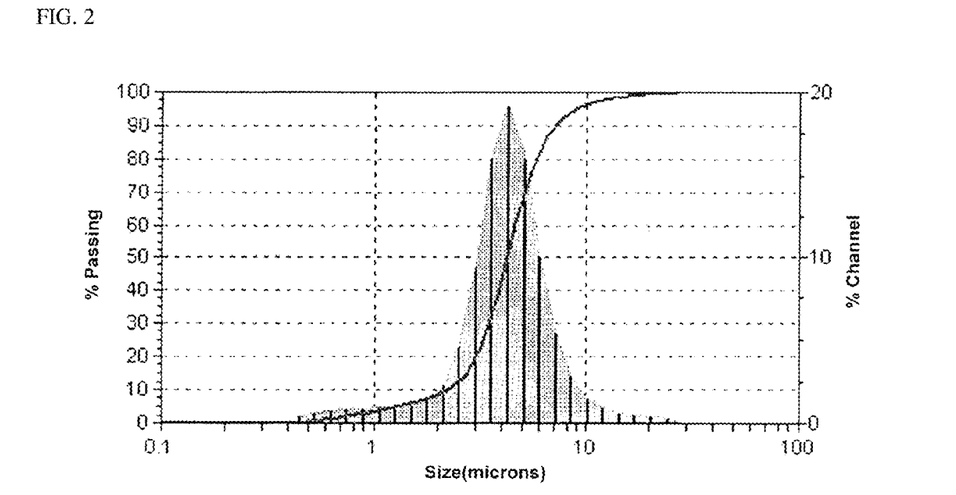
FIG. 2 is a graph showing particle size distribution of transition metal precursor particles (D50: 4.07 μm) of Example 1.
Figure 3:
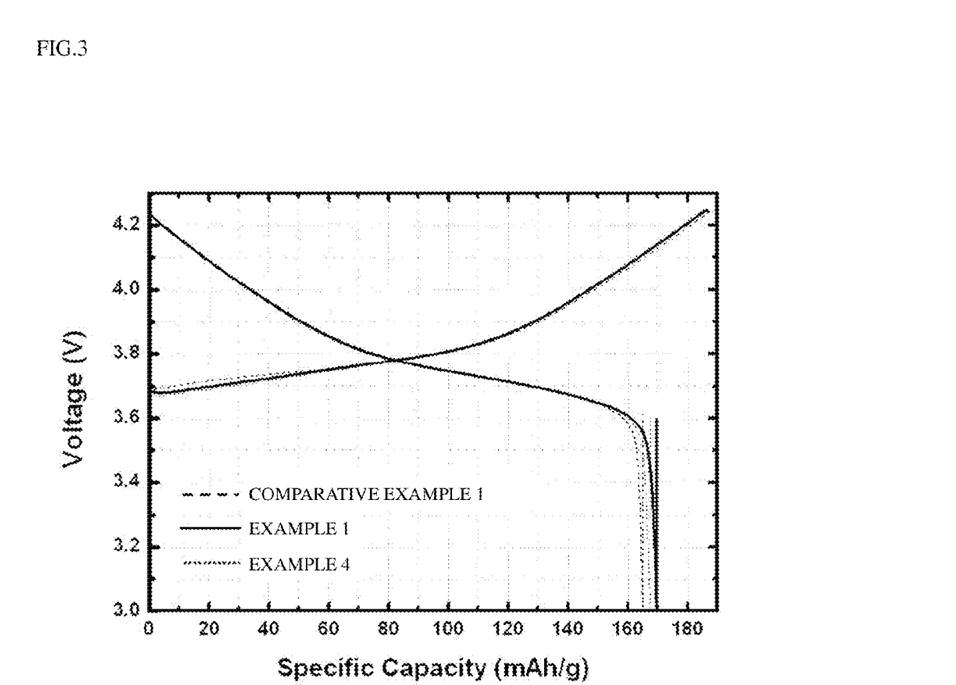
FIG. 3 is a graph showing electrochemical characteristics of lithium secondary batteries each including transition metal precursor particles prepared using a preparation method according to an embodiment of the present invention.

FIGS. 1A and 1B are scanning electron microscope (SEM) images of the transition metal precursors of Example 1 and Comparative Example 1. FIG. 2 is a graph showing particle size distribution of precursor particles (mass median diameter (D50): 4.07 μm) of Example 1.

Table 3 shows D50 and coefficient of variation of each of the precursor particles of Example 1 and the precursor particles of Comparative Example 1. Referring to Table 3, it can be confirmed that the precursor particles of Example 1 have an average diameter of 5 μm or less and a coefficient of variation of 0.375 (monodispersion), while the precursor particles of Comparative Example 1 have an average diameter of greater than 8 μm and a coefficient of variation of 0.706, which indicates poorer monodispersion than the precursor particles of Example 1.

TABLE 3

|  | Mass median diameter (D50) | C.V. |
| --- | --- | --- |
| Example 1 | 4.07 μm | 0.375 |
| Comparative Example 1 | 9.46 μm | 0.706 |

Experimental Example 4

Manufacture of Coin Cell and Evaluation of Electrochemical Characteristics Thereof Each of the prepared transition metal precursors and $Li_2CO_3$ were mixed in a weight ratio of 1:1 and the resultant mixture was calcined at 920° C. for 10 hours at a heating rate of 5° C./min to prepare a powder-type lithium transition metal oxide as a cathode active material. Subsequently, the powder-type cathode active material, Denka as a conductive material, and KF 1100 as a binder were mixed in a weight ratio of 95:2.5:2.5 to prepare a slurry and the slurry was uniformly coated on 20 μm thick Al foil. Thereafter, the coated Al foil was dried at 130° C., thereby completing manufacture of a cathode for lithium secondary batteries.

The fabricated cathode, a lithium metal foil as a counter electrode (an anode), and a polyethylene film as a separator (Celgard, thickness: 20 μm), and a liquid electrolyte containing 1M $LiPF_6$ dissolved in a mixed solvent of ethylene carbonate, dimethylene carbonate, and diethyl carbonate in a volume ratio of 1:2:1 were used to manufacture a 2032 coin cell.

Electrical properties of the cathode active material of each coin cell were evaluated at 3.0 to 4.25 V using an electrochemical analyzer (Toscat 3100U available from Toyo Systems). Results are shown in Table 4 below.

TABLE 4

|  | Initial discharge capacity (mAh/g) | Initial efficiency (%) | 2 C/0.1 C (%) |
| --- | --- | --- | --- |
| Example 1 | 168.3 | 89.8 | 88.5 |
| Example 2 | 167.3 | 89.1 | 87.9 |
| Example 3 | 166.9 | 89.4 | 87.8 |
| Example 4 | 166.8 | 89.6 | 87.0 |
| Comparative Example 1 | 165.2 | 87.6 | 85.2 |

Figure 4:
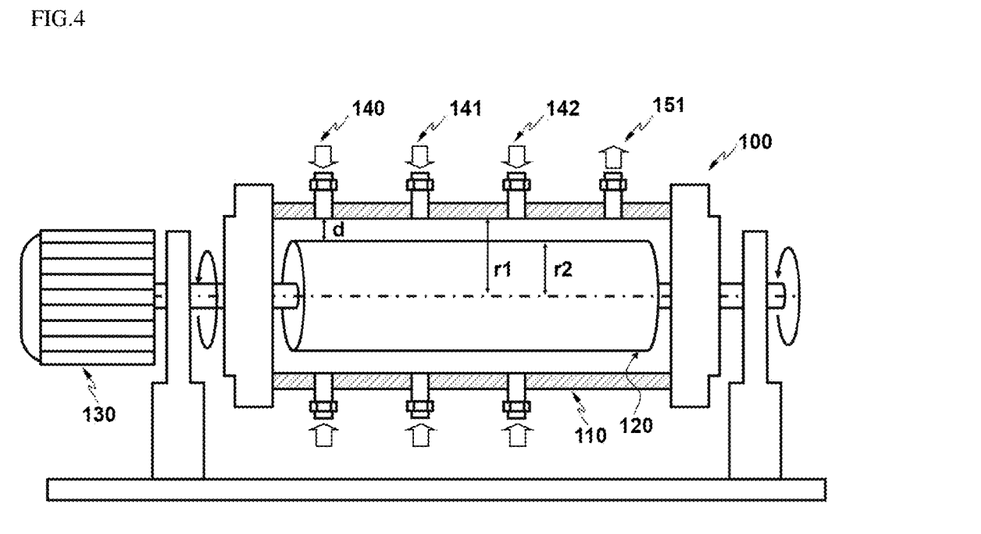
FIG. 4 is a side view of a reactor according to an embodiment of the present invention.
Figure 5:
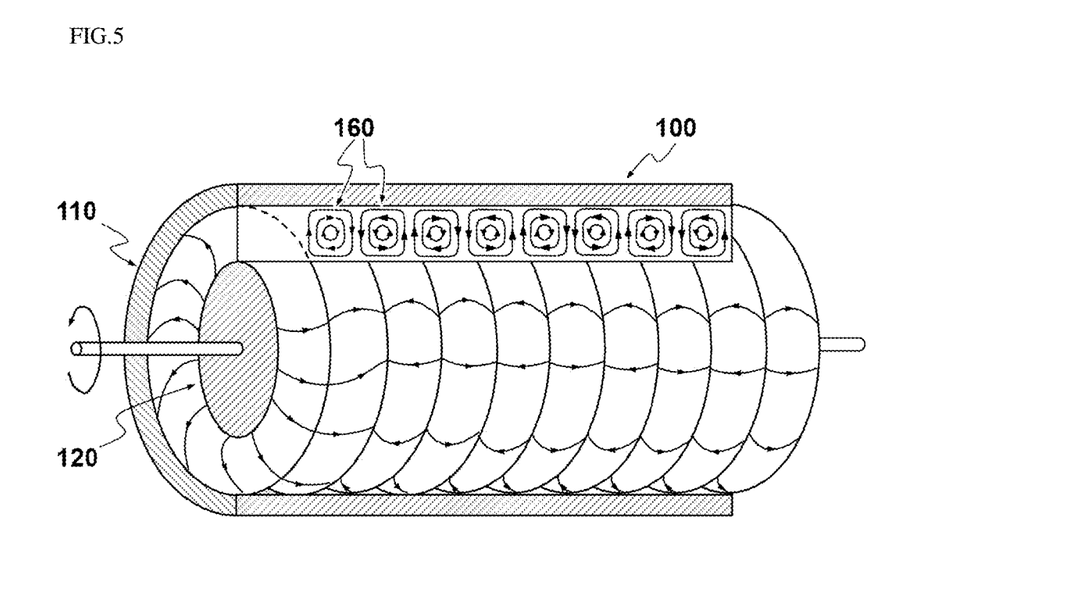
FIG. 5 is a view illustrating ring-shaped vortex pairs generated in a rotating reaction space of the reactor of FIG. 4 and a flow shape of a reaction fluid.

FIG. 4 is a side view of a reactor 100 according to an embodiment of the present invention. FIG. 5 is a view illustrating ring-shaped vortex pairs generated in a rotating reaction space of the reactor of FIG. 4 and a flow shape of a reaction fluid.

Figure 6:
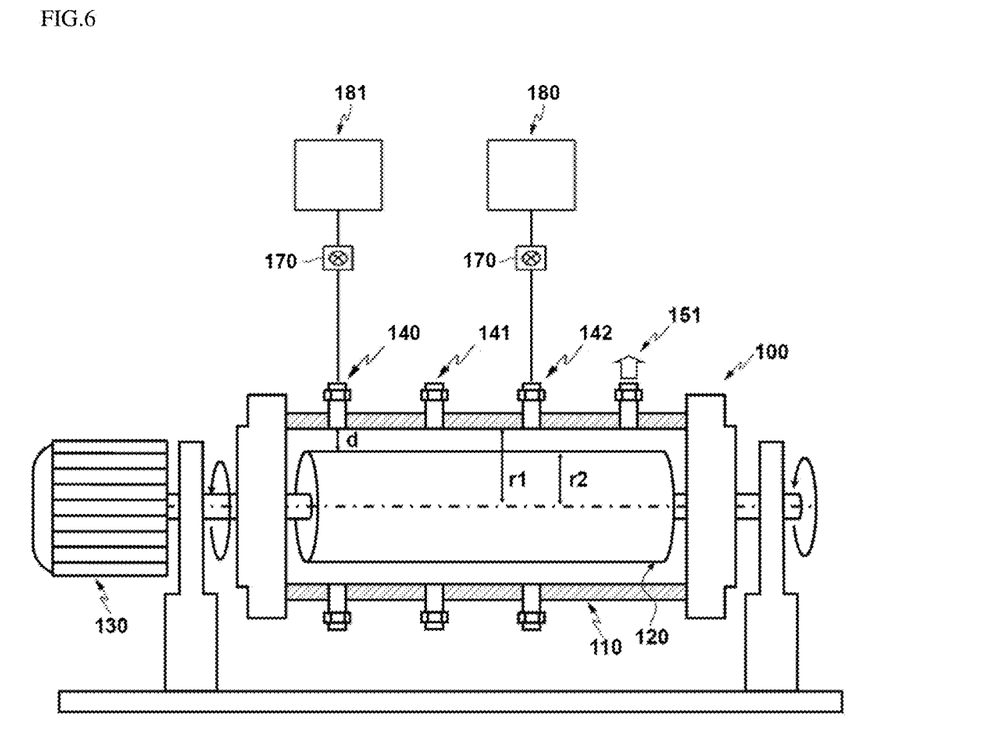
FIG. 6 is a view of a reactor according to another embodiment of the present invention.

FIG. 6 is a view of a reactor 100 according to another embodiment of the present invention.

Referring to FIG. 4, the reactor 100 for preparation of a precursor of a lithium composite transition metal oxide for lithium secondary batteries includes a hollow fixed cylinder 110 installed horizontally with respect to the ground, a rotating cylinder 120 disposed in the hollow fixed cylinder 110, having the same rotating shaft as that of the fixed cylinder 110, and having an outer diameter (2×r2) smaller than an inner diameter (2×r1) of the fixed cylinder 110, a rotating reaction space formed between the fixed cylinder 110 and the rotating cylinder 120, a plurality of inlets 140, 141 and 142 through which a reaction fluid is introduced into the rotating reaction space and an outlet 150 to discharge the reaction fluid, wherein the inlets 140, 141 and 142 and the outlet 150 are disposed on the fixed cylinder 110, and an electric motor 130 provided at a side surface of the fixed cylinder 110 to generate power for rotation of the rotating cylinder 120.

An effective volume of the rotating reaction space is determined by a ratio (d/r2) of a distance d between the fixed cylinder 110 and the rotating cylinder 120 to an outer radius r2 of the rotating cylinder 120.

Referring to FIGS. 4 and 5, when the rotating cylinder 120 is rotated by power generated by the electric motor 130 and thus reaches a critical Reynolds number, reaction fluids such as an aqueous solution of a composite transition metal hydroxide, aqueous ammonia, an aqueous sodium hydroxide solution, and the like introduced into the rotating reaction space via the inlets 140, 141 and 142 become unstable by centrifugal force applied towards the fixed cylinder 110 from the rotating cylinder 120 and, as a result, ring-shaped vortex pairs 160 rotating in opposite directions along a rotating shaft are periodically arranged in the rotating reaction space.

The length of the ring-shaped vortex pairs 160 in the direction of gravity is almost the same as the distance d between the fixed cylinder 110 and the rotating cylinder 120.

The outside of the rotating shaft may be sealed by a sealing member such as an O-ring to prevent air from being sucked into a gap between the rotating shaft and a bearing when the rotating cylinder 120 is rotated.

Referring to FIGS. 4 and 6, an aqueous transition metal salt solution, aqueous ammonia, an aqueous sodium hydroxide solution, and the like may be introduced into the rotating reaction space via the inlet 140 and heterogeneous materials such as a coating material may be introduced into the rotating reaction space via the inlet 141 or 142.

Referring to FIG. 6, the reactor 100 according to another embodiment of the present invention further includes storage tanks 180 and 181 to store an aqueous transition metal salt solution, aqueous ammonia, an aqueous sodium hydroxide solution, and the like and a metering pump 170 to control the amounts of reaction fluids introduced into the rotating reaction space.

The aqueous transition metal salt solution may be introduced into the rotating reaction space using the metering pump 170 in consideration of residence time, the aqueous sodium hydroxide solution may be introduced into the rotating reaction space in a rate-variable manner using the metering pump 170 so that pH thereof was kept constant, and the aqueous ammonia may be continuously supplied using the metering pump 170.

After reaction was completed, the prepared composite transition metal hydroxide was obtained via the outlet 150.

To adjust reaction temperature in a process of mixing the reaction fluids in the rotating reaction space between the fixed cylinder 110 and the rotating cylinder 120 using the vortex pairs 160, the reactor 100 may further include a heat exchanger on the fixed cylinder 110. The heat exchanger may be any heat exchanger that is commonly known in the art to which the present invention pertains.

Figure 7:
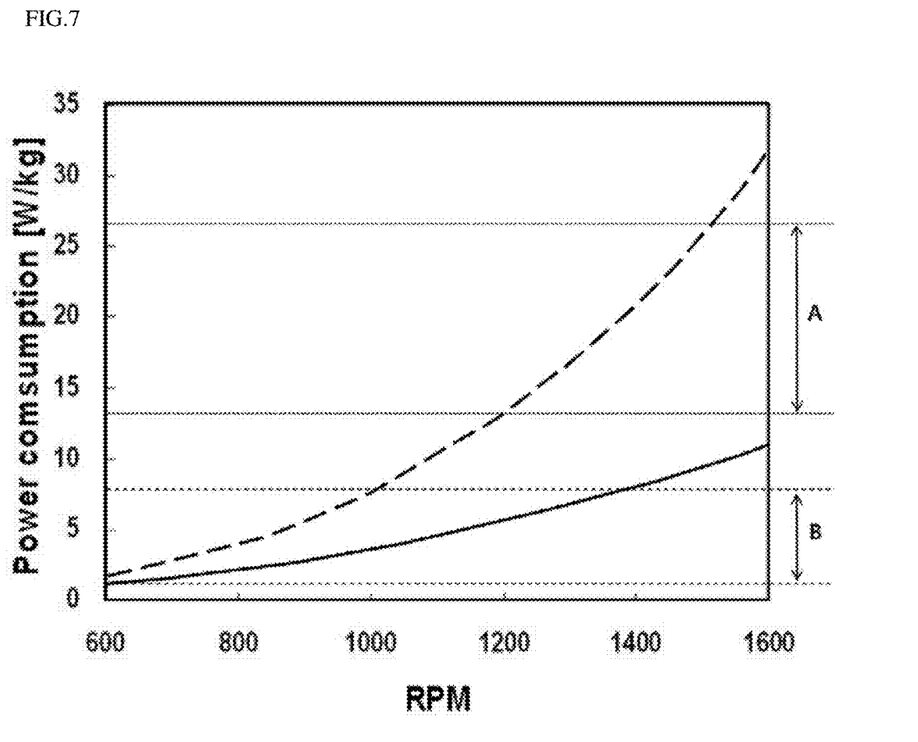
FIG. 7 is a graph showing comparison in power consumption per unit mass between a CSTR and the reactor according to the present invention.

FIG. 7 is a graph showing comparison in power consumption per unit mass between a CSTR and the reactor according to the present invention. A 4 L CSTR operates at a rotational speed of 1200 to 1500 rpm to form a desired particle size when synthesizing a precursor and, when the rotational speed is converted into stirring power per unit mass, the corresponding value is about 13 to 27 W/kg (see region A of FIG. 7). By contrast, a 0.5 L reactor according to the present invention enables synthesis of a precursor with a desired particle size at a rotational speed of 600 rpm to 1400 rpm and, when the rotational speed is converted into stiffing power per unit mass, the corresponding value is 1 W/kg to 8 W/kg (see region B of FIG. 7).

That is, the reactor according to the present invention enables synthesis of a precursor with a desired particle size using less stirring power per unit mass than the CSTR. This indicates that the reactor has higher stirring efficiency than that of the CSTR.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, composite transition metal hydroxide particles according to the present invention have a small average diameter, exhibit monodisperse particle size distribution, and are uniform and thus exhibit excellent rate characteristics, excellent low-temperature rate characteristics, and excellent electrode density.

In addition, the composite transition metal hydroxide particles have high crystallinity and thus have increased reactivity with a lithium precursor and, accordingly, a calcination temperature of a lithium composite transition metal oxide may be reduced.

The invention claimed is:

1. Precursor particles of a lithium composite transition metal oxide for lithium secondary batteries, wherein the precursor particles are composite transition metal hydroxide particles comprising at least two transition metals and having an average diameter of 1 μm to 8 μm, wherein the composite transition metal hydroxide particles exhibit monodisperse particle size distribution and have a coefficient of variation of 0.2 to 0.7, wherein the composite transition metal hydroxide particles contain an impurity derived from a transition metal salt for preparation of a composite transition metal hydroxide, wherein an amount of the impurity is 0.3 wt % to 0.4 wt % based on of total weight of the composite transition metal hydroxide particles, wherein the impurity is a salt ion comprising a sulfate ion ($SO_4^{2-}$), and wherein the composite transition metal hydroxide is a compound represented by Formula 1 below:

$$M(OH_{1-x})_2 \qquad (1),$$

wherein M includes two or more transition metals selected from the group consisting of nickel, cobalt and manganese; and $0 \leq x \leq 0.8$.

2. The precursor particles according to claim 1, wherein the average diameter of the composite transition metal hydroxide particles is 1 μm to 5 μm.

3. The precursor particles according to claim 1, wherein the amount of the impurity is 0.3 wt % to 0.4 wt % based on the total weight of the composite transition metal hydroxide particles.

4. The precursor particles according to claim 1, wherein the transition metal salt is a sulfate.

5. The precursor particles according to claim 4, wherein the sulfate is at least one selected from the group consisting of nickel sulfate, cobalt sulfate, and manganese sulfate.

6. The precursor particles according to claim 1, wherein the salt ion further comprises a nitrate ion ($NO_3^-$).

7. The precursor particles according to claim 1, wherein M further includes at least one additional transition metal selected from the group consisting of aluminum (Al), copper (Cu), iron (Fe), magnesium (Mg), boron (B), chromium (Cr), and period 2 transition metals.

8. The precursor particles according to claim 1, wherein M includes each of nickel, cobalt and manganses, and optionally further includes at least one additional transition metal selected from the group consisting of aluminum (Al), copper (Cu), iron (Fe), magnesium (Mg), boron (B), chromium (Cr), and period 2 transition metals.

* * * * *